United States Patent [19]

Scherl et al.

[11] 4,411,015

[45] Oct. 18, 1983

[54] METHOD AND APPARATUS FOR AUTOMATIC RECOGNITION OF IMAGE AND TEXT/GRAPHICS AREAS ON A MASTER

[75] Inventors: Wolfgang Scherl, Munich; Ludwig Abele, Poecking; Friedrich Wahl; Hermann Fuchsberger, both of Munich, all of Fed. Rep. of Germany

[73] Assignee: Siemens Aktiengesellschaft, Berlin & Munich, Fed. Rep. of Germany

[21] Appl. No.: 265,107

[22] Filed: May 19, 1981

[30] Foreign Application Priority Data

May 23, 1980 [DE] Fed. Rep. of Germany ....... 3019836

[51] Int. Cl.$^3$ .............................................. G06K 9/36
[52] U.S. Cl. ....................................... 382/51; 358/282
[58] Field of Search .......... 340/146.3 MA, 146.3 AG, 340/146.3 Y, 146.3 H, 146.3 R; 358/21 R, 160, 161, 166, 167, 280, 282, 284; 382/18, 51

[56] References Cited

U.S. PATENT DOCUMENTS

| | | | |
|---|---|---|---|
| 3,496,543 | 2/1970 | Greenly | 340/146.3 H |
| 3,662,341 | 5/1972 | Baumgartner et al. | 340/146.3 AG |
| 3,805,239 | 4/1974 | Watanabe | 340/146.3 MA |
| 4,119,947 | 10/1978 | Leighton et al. | 340/146.3 MA |
| 4,162,481 | 7/1979 | Du Vall | 340/146.3 MA |
| 4,208,652 | 6/1980 | Marshall | 340/146.3 Y |
| 4,218,673 | 8/1980 | Yoshida | 340/146.3 Y |

*Primary Examiner*—Leo H. Boudreau
*Attorney, Agent, or Firm*—Hill, Van Santen, Steadman & Simpson

[57] ABSTRACT

An apparatus and method for automatic recognition of image and text/graphics areas on a master undertake an opto-electronic scanning of the master with analog values obtained by the scanning being sampled and converted into digital information which is stored in a data field which is divided into a number of windows having edge lengths selected to be greater than the spacing between two successive lines of text. A gray-scale value histogram is generated for each window and is statistically analyzed for determining whether the area of the master represented by the window is predominantly a text/graphics area or an image area based on known statistical characteristics generally related to each type of area.

3 Claims, 4 Drawing Figures

METHOD AND APPARATUS FOR AUTOMATIC RECOGNITION OF IMAGE AND TEXT/GRAPHICS AREAS ON A MASTER

BACKGROUND OF THE INVENTION

The present invention relates to a method and apparatus for automatic recognition of image and text/graphics areas on a master and in particular to a method and apparatus which divides the master into a plurality of "windows" and statistically examines each subdivision.

Automatic word processing units are increasingly employed in office use for generating, modifying and storing written documents. Such devices permit in a simple manner correction of errors, insertions of new text passages, combinations of texts of different origins, random reproduction, and electronic storage of the data representing the text passages. The advantage of such automatic word processing units in comparison to traditional typewriters is a higher efficiency both in cost and time as well as a high degree of flexibility in the use of the unit.

The above advantages associated with conventional word processing units is significantly lessened if the apparatus and method for storing and/or transferring existing information on paper into the data processing unit cannot also be undertaken in an automatic or semi-automatic manner. A manual transfer of great amounts of text involves substantial time and expense. Masters which contain the information which is to be transferred into the data processing unit generally consist of areas of text and/or areas of graphic and/or areas of images. It is a problem in the art to achieve an optimum encoding of the data contained on such masters, as well as to achieve a separate manipulation of the different areas within the machine.

SUMMARY OF THE INVENTION

It is an object of the present invention to provide a method and apparatus for automatic recognition of image and text/graphics areas on a master which automatically separates such different information-containing areas and classifies the separated areas properly.

It is a further object of the present invention to provide such a method and apparatus which undertakes such separation and classification in a simple, rapid and reliable manner.

The above objects are inventively achieved in a method and apparatus which undertakes an opto-electronic scanning of a master containing information to be transferred to a word processing unit and which samples the analog values resulting from the scanning operation and converts those sampled values into digital information. The digital information is stored in a data field in a memory for the master being scanned, which memory is subdivided into "windows" having edged lengths which are selected to be greater than the spacing between two successive lines of text. A grayscale value histogram is generated by a computer for each window and the statistical parameters of each window histogram are compared with known statistical parameters generally associated with a text/graphics and an image histogram and a classification and storage are undertaken according to the result of the comparison.

The above method and apparatus provide a relatively simple means for classifying and storing text/graphics and image information from a master and can be realized in a particularly cost-favorable and space saving manner by the use of, for example, a microcomputer.

DESCRIPTION OF THE PREFERRED EMBODIMENTS

Figure 1:
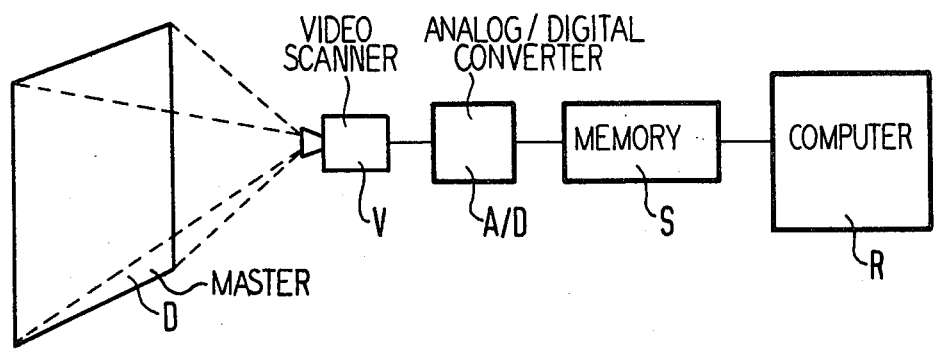
FIG. 1 is a schematic block diagram of an apparatus for automatic recognition of image and text/graphics areas on a master constructed in accordance with the principles of the present invention.

An apparatus for automatic recognition of image and text/graphics areas on a master is schematically shown in FIG. 1 consisting of an opto-electronic video scanner V of any type known to those skilled in the art which scans a master D containing text/graphics and/or image information which is to be stored and processed. The analog signal from the video scanner V is supplied to an analog/digital converter A/D which converts sampled analog values into digital information and transmits the digital information for storage in a memory S. The memory S is connected to a computer R for undertaking a statistical analysis of the stored digital data in a manner described in detail below. The memory S is preferably a semiconductor memory. The computer R is preferably a microcomputer having access to the memory S.

The information of the one page master D which has been scanned is converted into a data field associated with that page which is stored in a number of memory cells in the memory S which are covered by a gird of small "windows" such that the "windows" partially overlap. The statistical parameters of the partial information contained in each "window" are employed in a further analysis to reach a determination as to whether the information in a particular "window" is predominantly text/graphics or predominantly image information. In order to achieve sufficient reliability and precision, the edge length of the "windows" is selected so as to be greater than the distance between two successive lines of text.

Figure 3:
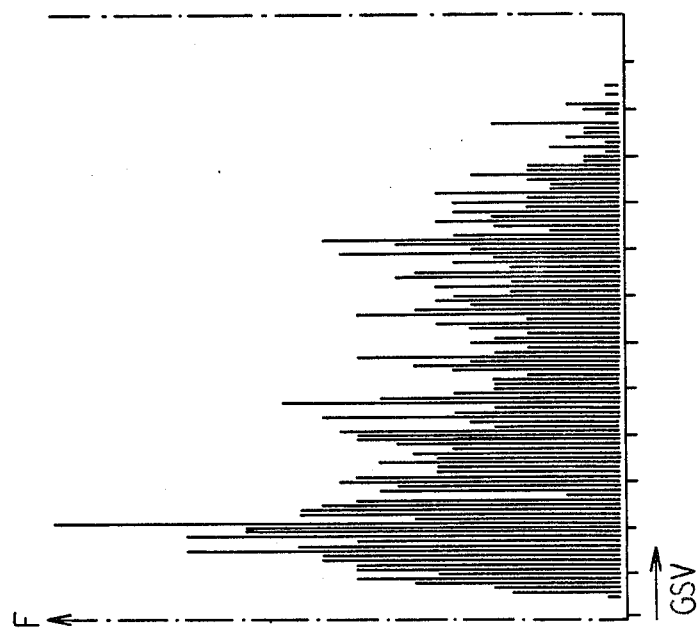
FIG. 3 is a typical grayscale value histogram for an image area.
Figure 2:
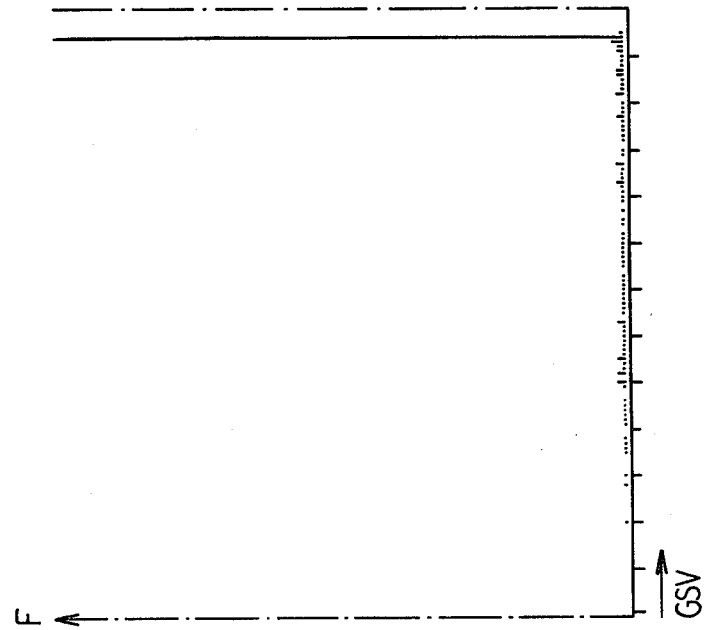
FIG. 2 is a typical grayscale value histogram for a text area.

For identification of the statistical parameters, a grayscale value histogram is generated for each "window" by any suitable method and apparatus known to those skilled in the art. A typical grayscale value histogram for a text/graphics area is shown in FIG. 2, and a typical grayscale value histogram for an image area is shown in FIG. 3. In each histogram, the frequency F for each grayscale value within a "window" is plotted on the vertical axis against this grayscale value GSV on the horizontal axis.

Two different methods for evaluating statistical features from the grayscale value histograms for the purpose of automatic recognition of text/graphics and image areas on the master D are described below.

As stated above, a typical grayscale value histogram for a text area is shown in FIG. 2. The characteristic of the text grayscale value histogram is the pronounced frequency spike for very light master areas. The reason for the spike is the existence of a very high background component in areas of text/graphics, as opposed to the portion of the area actually covered by type. In this case, the background is the lightest area of the master which is scanned. Because of the low spatial resolution of the scanner, the written characters produce no pronounced spikes on the histogram, but rather, exhibit a broad distribution among darker grayscale values. The typical grayscale value histogram for an image area shown in FIG. 3 wherein the portion of darker grayscale values is significantly higher. Often in histograms representing image areas the maximum brightness of the paper background is never seen.

The above characteristics of histograms for text/graphics and image areas is employed in the inventive apparatus and method for the discrimination of such areas. To that end, the maximum occurring brightness value $i_{max}$ is determined in a first step. The percentage of very bright components in the "window" is calculated according to the equation $$K = \frac{\sum_{i=S}^{i_{max}} h(i)}{N}$$

wherein $i_{max}$ equals the brightest occurring grayscale value, S equals 0.8 $i_{max}$, N equals the overall number of samplings, i equals the index for the brightness of the grayscale value, and h(i) equals the number of grayscale values with the brightness i in the "window."

The value K is then utilized for discrimination between image and text/graphics areas. The derived values K are compared to a decision threshold value t. In a sample embodiment of the invention, t is empirically selected at 0.4. In those cases in which K is less than t, the "window" is classified as an image area. In those cases in which K is greater than or equal to t, the "window" is classified as a text area.

Another method for use in the inventive apparatus for evaluating statistical features from the grayscale value histograms undertakes a determination of a pair of values S and C for each "window" as a first step. The value S is calculated as follows:

$$S = \Sigma(i-\mu)^3 h(i)/\sigma^3.$$

The value C is calculated according to the equation:

$$C = \Sigma(i-\mu)^4 h(i)/\sigma^4.$$

In the above equations, i is the respective brightness value, h(i) is the histogram value for i, that is, the number of grayscale values with the brightness i in each "window", $\mu$ is the mean gray value of the overall image and $\sigma$ is the standard deviation. On the basis of the typical asymmetry of the text grayscale value histogram, the values S and C for a text area lie within a range along a guadratic curve defined by the equation:

$$\hat{C} = a_2 S^2 + a_1 S + a_0.$$

Figure 4:
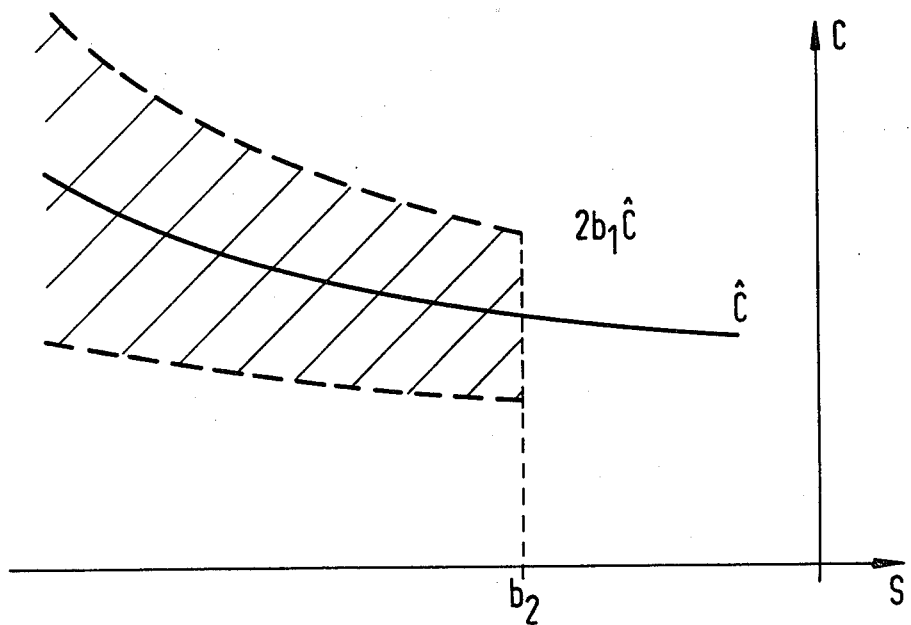
FIG. 4 is a graphical representation of one method according to the principles of the present invention for distinguishing between text/graphics and image areas.

This range is graphically depicted in FIG. 4. The limits are defined by the relationships $$|C - \hat{C}| < b_1 \hat{C}$$

along the C axis and $S < b_2$ along the S axis. The value C represents the quadratic curve and the values $a_0$, $a_1$ and $a_2$ as well as $b_1$ and $b_2$ are empirically determined constants.

The computer R undertakes a comparison in a known manner to determine whether the pairs of values S and C lie within or beyond the defined range. For this purpose, the computer R calls the data required from the memory S.

The size of the "windows" may be varied depending upon the type of master D to be scanned. For example, the edge lengths of the "windows" may be selected to be not greater than the spacing between two through three line sections of a text master.

Although other modifications and changes may be suggested by those skilled in the art it is the intention of the inventors to embody within the patent warranted hereon all changes and modifications as reasonably and properly come within the scope of their contribution to the art.

We claim as our invention:

1. A method for automatic recognition of image and text/graphics areas on a master comprising the steps of:
   opto-electronically scanning said master for generating analog signals corresponding to printed matter on said master;
   converting said analog signals into corresponding digital information;
   storing said digital information in a data field in a memory which is subdivided into a plurality of partially overlapping windows forming a grid co-extensive with said data field, said windows having edge lengths selected to be greater than the known spacing between two successive lines of text on said master;
   generating a grayscale value histogram for each window;
   evaluating the maximum occurring brightness value of the entire master; defining a lower brightness limit by a certain percentage of the maximum occurring brightness value in determining the percentage of samples within each grayscale value histogram which have a brightness between said maximum occurring brightness value and said lower brightness limit;
   comparing said percentage of samples for each window to a selected decision threshold value;
   classifying a window as an image area if said percentage of samples is less than said decision threshold value; and
   classifying said window as a test/graphics area if said percentage of samples is equal to or greater than said decision threshold value.

2. The method of claim 1 wherein said selected decision threshold value is defined by the steps of:
   determining a value S for each window according to the equation $S = \Sigma(I-\mu)^3 h(i)/\sigma^3$;
   calculating a value C for the same window according to the equation $C = \Sigma(i-\mu)^4 h(i)/\sigma^4$,
   wherein
      i is the respective brightness value in the plurality of brightness values in the histogram for said window, h(i) is the number of samples having the brightness i in said window, $\mu$ is the mean value of the overall information in said histogram, and $\sigma$ is the standard deviation for said histogram; and
   wherein the step of classifying said window as a text area is defined by the step of:
      classifying said window as a text area when said values S and C for said window are within a range on a surface having a vertical axis representing different C values and a horizontal axis representing different S values, said range defined by the relationships $|C-\hat{C}|<b_1\hat{C}$ along said vertical axis and $S<b_2$ along said horizontal axis, wherein $\hat{C}$ is a quadratic curve of the form $C=a_2S^2+a_1S°a_0$ wherein $a_0$, $a_1$, $a_2$, $b_1$ and $b_2$ are empirically determined constants.

3. An apparatus for automatic recognition of image and text/graphics areas on a master comprising:
- a video scanner for opto-electronically scanning a master containing information to be calssified and stored as an image area or a text area, said video scanner generating analog signals corresponding to information on said master;
- an analog to digital converter post-connected to said video scanner for converting said analog signals from said video scanner into digital information;
- a semiconductor memory connected to said analog to digital converter for storing said digital information in the form of a plurality of overlapping windows forming a grid and each having edge lengths which are greater than the known spacing between two successive lines of text on said master; and
- a microcomputer having access to said memory for generating a grayscale value histogram for each window, evaluating the maximum occurring brightness value of the entire master, defining a lower brightness limit by calculating a percentage of the maximum occurring brightness value and determining the percentage of samples within each grayscale value histogram having a brightness between said maximum occurring brightness value and said lower brightness limit, comparing said percentage of samples for each window to a selected decision threshold value, and for classifying the information in each of said windows as a text/graphics area if said percentage of samples for a window is equal to or greater than said decision threshold value and for classifying the information in a window as an image area if said percentage of samples is less than said decision threshold value.

* * * * *